(12) United States Patent
Imanishi et al.

(10) Patent No.: US 6,243,735 B1
(45) Date of Patent: *Jun. 5, 2001

(54) MICROCONTROLLER, DATA PROCESSING SYSTEM AND TASK SWITCHING CONTROL METHOD

(75) Inventors: Hiroshi Imanishi, Kyoto; Toshiyuki Araki, Osaka, both of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,474

(22) Filed: Aug. 31, 1998

(30) Foreign Application Priority Data

Sep. 1, 1997 (JP) .................................. 9-235625

(51) Int. Cl.[7] ........................................ G06F 9/00
(52) U.S. Cl. .................................. 709/102; 709/100
(58) Field of Search .................. 709/100, 101, 709/102, 103, 104, 108, 105, 106, 107

(56) References Cited

U.S. PATENT DOCUMENTS

| | | | |
|---|---|---|---|
| 4,084,224 | * 4/1978 | Appell et al. | 709/100 |
| 4,807,142 | * 2/1989 | Agarwal | 364/200 |
| 4,979,118 | * 12/1990 | Kheradpir | 364/436 |
| 5,353,331 | * 10/1994 | Emery et al. | 379/58 |
| 5,425,086 | * 6/1995 | Hidaka et al. | 379/113 |
| 5,465,335 | * 11/1995 | Anderson | 395/375 |
| 5,640,563 | * 6/1997 | Carmon | 709/102 |

FOREIGN PATENT DOCUMENTS 05120039  5/1993 (JP).
06028323  2/1994 (JP).

OTHER PUBLICATIONS

Masahiro Gion, et al., "National Technical Report", vol. 40, No. 6, pp. 122–128, Dec. 1994.
Takashi Yokomizo, "Interface" pp. 135–146, Jan. 1995.

* cited by examiner

Primary Examiner—Majid Banankhah
(74) Attorney, Agent, or Firm—McDermott, Will & Emery

(57) ABSTRACT

A processor, a task management table, and a scheduler are built in a microcontroller. The processor sequentially runs a plurality of tasks for controlling hardware engines (cores) respectively allocated thereto. The task management table stores task management information which includes state information (ST INFO) representative of the execution state of each task, priority information (PRI INFO) representative of the execution priority of each task, and core identification information (CID INFO) representative of the allocation of the tasks to the cores. The scheduler allows the processor to switch between tasks on the basis of the task management information when a given instruction is decoded or when the execution of any one of the cores is terminated.

15 Claims, 7 Drawing Sheets

MICROCONTROLLER, DATA PROCESSING SYSTEM AND TASK SWITCHING CONTROL METHOD

BACKGROUND OF THE INVENTION

This invention relates to a multitasking microcontroller and to a data processing system employing such a multitasking microcontroller operable to control a plurality of hardware engines and it further relates to a method of controlling task switching.

Multitasking microcontrollers have been known in the art. In a typical multitasking microcontroller, a built-in processor sequentially executes a plurality of tasks and a task timer therefore makes periodic issues of timer interruptions which request task switching to be made. Every time the processor accepts such a timer interruption, an interruption handling routine in the operating system (OS) is activated. The interruption handling routine performs the scheduling of tasks and the saving and restoring of resources.

Conventional multitasking microcontrollers have some drawbacks. For example, the scheduling of tasks is carried out using an interruption handling routine in a conventional multitasking microcontroller. This produces the problem that there is created much overhead at task switching time, therefore resulting in a drop in microcontroller performance.

This is a serious problem for the applications which attach great importance to real-time processing such as image data encoding.

SUMMARY OF THE INVENTION

Accordingly, an object of the present invention is to provide a microcontroller capable of switching between tasks at a high speed.

Another object of the present invention is to provide a data processing system employing a microcontroller (which controls a plurality of hardware engines) for the realization of high-speed task switching in the microcontroller.

Yet another object of the present invention is to provide a method of controlling task switching for the realization of high-speed task switching.

The objects of the present invention are achieved as follows. The microcontroller of the present invention controls the task switching not by means of an interruption handling routine, but by means of a hardware scheduler. In accordance with the present invention, a plurality of tasks are allocated to respective hardware engines. In such an environment, a task switching operation is controlled by the hardware scheduler on the basis of information representative of the allocation of the tasks to the hardware engines. Some of the hardware engines execute time critical processes and the other hardware engines do not. In accordance with the present invention, a relationship among the hardware engines is reflected in the execution priority of the tasks, which makes it possible to select a task to be run next in a short time without redeterming which of the hardware engines executes a time critical process at the time of task switching. In other words, there is created less overhead when task switching occurs. High-speed task switching is realized.

Undesirable dead time occurs in a time sharing method which carries out switching between tasks in response to an interruption periodically issued by a task timer, in view of which the present invention was made. Accordingly, the microcontroller of the present invention adopts an event-driven method capable of performing task switching in fast response to the occurrence of an event (i.e., an event of hardware engine execution termination). Each task can be in one of at least three states: a first state (the state of READY) representative of an execution wait status, a second state (the state of ACTIVE) representative of a running status, and a third state (the state of SLEEP) representative of an allocated hardware engine execution termination status. A task is in the state of ACTIVE when it uses the microcontroller and in the state of ACTIVE a hardware engine allocated to the task is controlled. A task is in the state of READY when it is not selected therefore waiting to be selected although it is ready to use the microcontroller. A task is in the state of SLEEP when it waits for a hardware engine allocated thereto to be execution-terminated (in other words, it is not ready to use the microcontroller). A task that has finished activating its allocated hardware engine makes a state transition from ACTIVE to SLEEP in response to a given instruction (the $task_{13}$ sleep instruction). When the execution of a certain hardware engine is terminated, a task allocated to that hardware engine makes a state transition from SLEEP to READY and a task under execution makes a state transition from ACTIVE to READY. Thereafter, a task having the highest execution priority in all tasks assuming the state of READY is selected as a task to be run next. The task thus selected makes a state transition from READY to ACTIVE.

If a plurality of register files are prepared in the microcontroller so that a plurality of hardware engines can use the register files as mutually independent working areas, there is created much less overhead at the time of task switching because what is required to do at the task switching time is just saving processor resources such as program counter. A register file for storing a setting parameter common to a plurality of hardware engines can be prepared in the microcontroller.

DETAILED DESCRIPTION OF THE INVENTION

Figure 1:
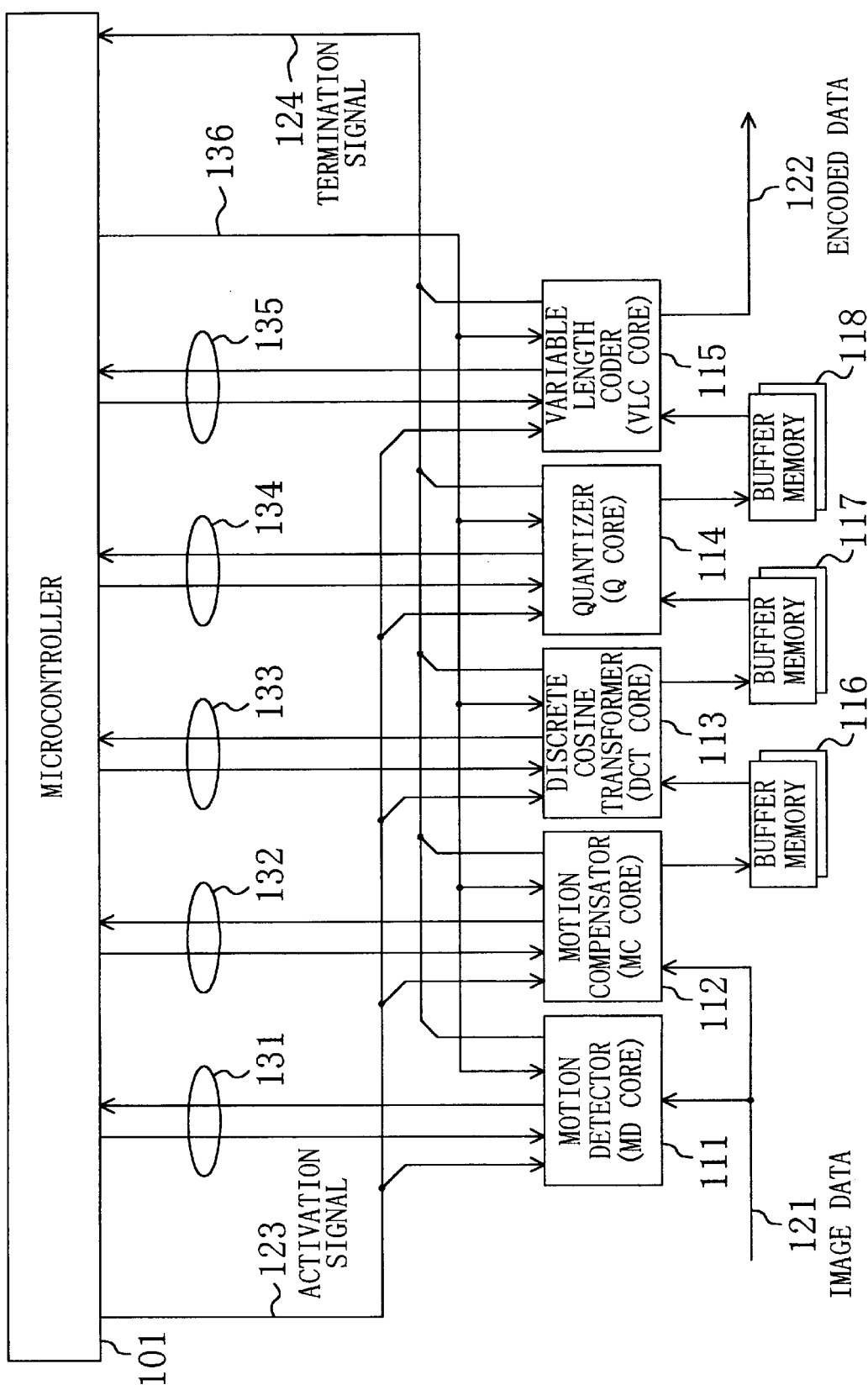
FIG. 1 is a block diagram showing the structure of an MPEG image encoder in accordance with the present invention.

FIG. 1 shows an MPEG (Moving Picture Experts Group) image encoder which is one of the data processing systems in accordance with the present invention. Referring to FIG. 1, the MPEG image encoder has a single microcontroller 101, five different hardware engines (hereinafter called the cores) 111–115 together forming a macroblock pipeline, and three buffer memories 116–118. The core 111 is a motion detector (MD). The core 112 is a motion compensator (MC). The core 113 is a discrete cosine transformer (DCT). The core 114 is a quantizer (Q). The core 115 is a variable length coder (VLC). All the cores 111–115 are controlled by the microcontroller 101. 121 is image data to be encoded and 122 is encoded data representative of a result of the encoding operation. The microcontroller 101 sends an activation signal 123 to each core 111–115 and receives a termination signal 124 from each core 111–115. The microcontroller 101 is allowed to individually communicate with each core 111–115 through signal lines 131–135. Additionally, the microcontroller 101 provides a parameter common to the five cores 111–115 through a signal line 136.

Figure 2:
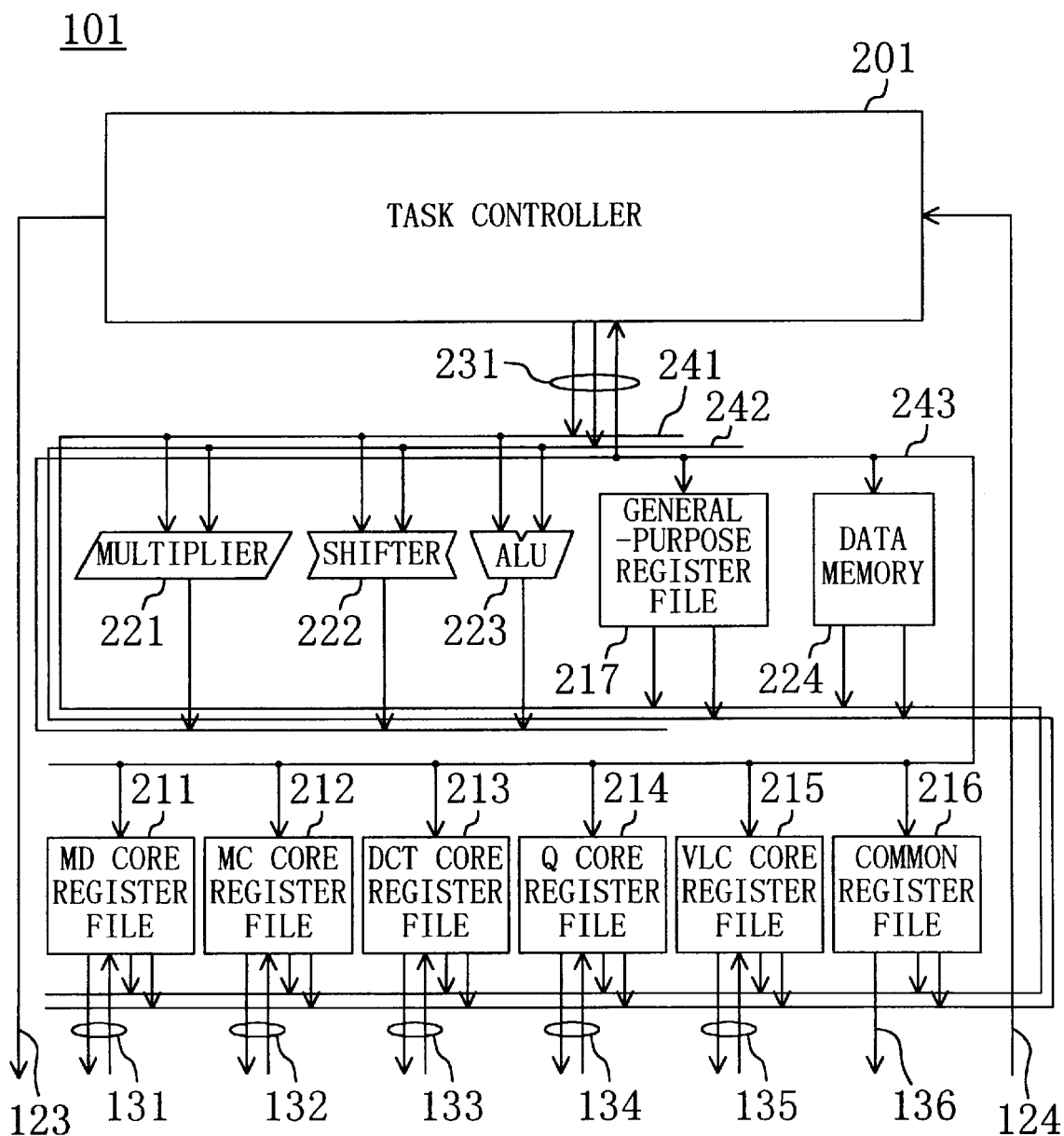
FIG. 2 is a block diagram showing details of the structure of a microcontroller of FIG. 1.

FIG. 2 shows in detail the structure of the microcontroller 101. The microcontroller 101 has a task controller 201 for the realization of multitasking, five core register files 211–215 for use by the five cores 111–115 as mutually independent working areas, a single common register file 216 for storing a setting parameter common to at least two of the five cores 111–115, a single general-purpose register file 217 for use by the task controller 201 as a working area, a multiplier 221, a shifter 222, an arithmetic and logic unit (ALU) 223, and a data memory 224. 241 is an A bus. 242 is a B bus. 243 is a C bus. 231 is a signal line for connecting together the buses 241–243 and the task controller 201. The task controller 201 provides the activation signal 123 and receives the termination signal 124. Each of the register files 211–216 is connected between the C bus 243 and a corresponding one of the signal lines 131–136. Additionally, each of the register files 211–216 has two outputs that are connected to the A bus 241 and to the B bus 242 respectively. The general-purpose register file 217 and the data memory 224 each have a single input that is connected to the C bus 243 and two outputs that are connected to the A bus 241 and to the B bus 242 respectively. The multiplier 221, the shifter 222, and the ALU 223 each have two inputs that are connected to the A bus 241 and to the B bus 242 respectively and a single output that is connected to the C bus 243. A variation to the above can be made in which the placement of the five core register files 211–215 and the common register file 216 is omitted and the signal lines 131–136 extend directly form the C bus 243.

In accordance with the MPEG image encoder of FIG. 1, image data processes proceed in units of macroblocks each containing 16×16 pixels. Firstly, the MD core 111 finds candidate motion vectors about the input image data 121. In the MC core 112, image differential data are found using the candidate motion vectors to select an optimal motion vector. Differential data with respect to the selected motion vector is discrete cosine transformed in the DCT core 113, quantized in the Q core 114, variable length coded in the VLC core 115 together with side information such as the motion vectors found, and finally provided as the encoded data 122.

The above is discussed in detail with reference to FIG. 2. The task controller 201 first sets an operating parameter to the MD core register file 211 through the signal line 231, the ALU 223, and the C bus 243 and provides the activation signal 123 to make the MD core 111 active. The MD core 111 reads in the operating parameter from the MD core register file 211 through the signal line 131 and inputs the image data 121. Upon termination of the execution of the MD core 111, candidate motion vectors found in the MD core 111 are written into the MD core register file 211 through the signal line 131, and the MD core 111 provides the termination signal 124. In response to the termination signal 124, the task controller 201 reads out the candidate motion vectors from the MD core register file 211. Based on the candidate motion vectors, the task controller 201 computes an operating parameter for the MC core 112 by the use of the multiplier 221, the shifter 222, the ALU 223, and the general-purpose register file 217. The operating parameter is set to the MC core register file 212 and the MC core 112 is made active by the activation signal 123. The MC core 112 reads in the operating parameter from the MC core register file 212 through the signal line 132. Thereafter, the MC core 112 finds image differential data. Upon termination of the execution of the MC core 112, a sum of the image differential data is written into the MC core register file 212 by way of the signal line 132, the image differential data are written into the buffer memory 116, and the MC core 112 provides the termination signal 124. In response to the termination signal 124, the task controller 201 reads out the image differential data sum from the MC core register file 212. Based on the image differential data sum, the task controller 201 selects an optimum motion vector from among the aforesaid candidate motion vectors through the use of the multiplier 221, the shifter 222, the ALU 223, and the general-purpose register file 217. An address indicative of the location of differential data corresponding to the optimum motion vector is set in the DCT core register file 213 and the DCT core 113 is made active by the activation signal 123. Based on the address set in the DCT core register file 213, the DCT core 113 reads out the differential data from the buffer memory 116 for DCT. Upon termination of the execution of the DCT core 113, a result of the DCT operation is written into the buffer memory 117 and the DCT core 113 provides the termination signal 124. The Q core 114 performs quantization and a result of the quantization operation is written into the buffer memory 118. The VLC core 115 performs VLC and a result of the VLC operation is provided as the encoded data 122. Some of the five cores 111–115 exchange the signals 123 and 124 with the microcontroller 101 a plurality of times per macroblock processing. The common register file 216 is used in cases such as when a common parameter for switching between MPEG1 and MPEG2 is pre-supplied to the five cores 111 and when a common parameter for designating a motion estimation mode is pre-supplied to the cores 111 and 112.

Figure 3:
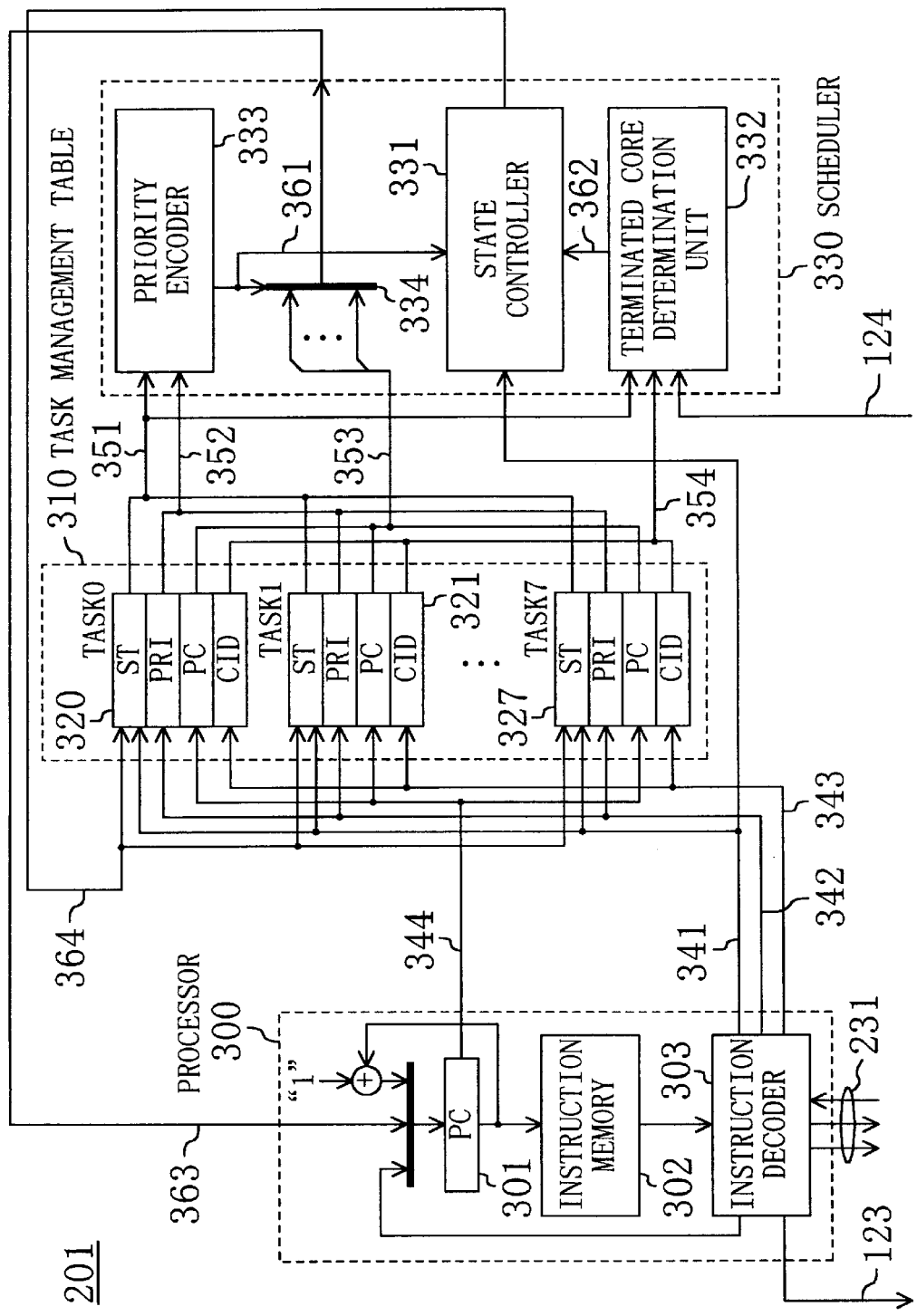
FIG. 3 is a block diagram showing details of the structure of a task controller of FIG. 2.

Referring to FIG. 3, the structure of the task controller 201 is now described in detail. The task controller 201 has a processor 300, a task management table 310, and a scheduler 330. The processor 300 is a RISC (reduced instruction set computer) processor capable of sequential execution of eight tasks at most. The processor 300 has a program counter (PC) 301 for generating instruction addresses, an instruction memory 302 for storing a program of a series of instructions, and an instruction decoder 303 for decoding instructions. The instruction decoder 303 sends the activation signal 123 to each core. The instruction decoder 303 is connected to resources for the execution of instructions, such as the multiplier 221, the shifter 222 and the ALU 223, through the signal line 231. The task management table 310 is a circuit block for storing task management information. The task management table 310 has eight task management register files 320–327 that are associated with eight tasks from TASK0 to TASK7, respectively. The task management information includes state information (ST INFO) representative of the execution status of each task, priority information (PRI INFO) representative of the execution priority of each task, and core identification information (CID INFO) representative of the allocation of the tasks to the five cores 111–115. Additionally, the task management table 310 has PC regions for the tasks for saving the processor's 300 resources (i.e., the contents of the PC 301). Such a region is also used to save a flag concerning a result of the arithmetic operation of the ALU 223 (see FIG. 2). The scheduler 330 is a circuit block operable to allows the processor 300 to switch between tasks on the basis of the task management information stored in the task management table 310. The scheduler 330 has a state controller 331, a terminated core determination unit (TCDU) 332, a priority encoder 333, and a selector 334. In response to the termination signal 124 sent from any one of the five cores 111–115 (i.e., a core the execution of which is terminated), the TCDU 322 identifies a task allocated to that execution-terminated core. Such identification is carried out with reference to the task management table 310 and a task number 362 representative of a result of the identification operation is communicated to the state controller 331. The priority encoder 333 is a circuit block for selecting a task to be run next. Referring to the task management table 310, the priority encoder 333 performs such a selection operation and a task number 361 representative of a result of the selection operation is communicated to the state controller 331 as well as to the selector 334. The state controller 331 is a circuit block for updating the ST INFO stored in the task management table 310. The selector 334 controls the restoration of resources to the processor 300.

Figure 4:
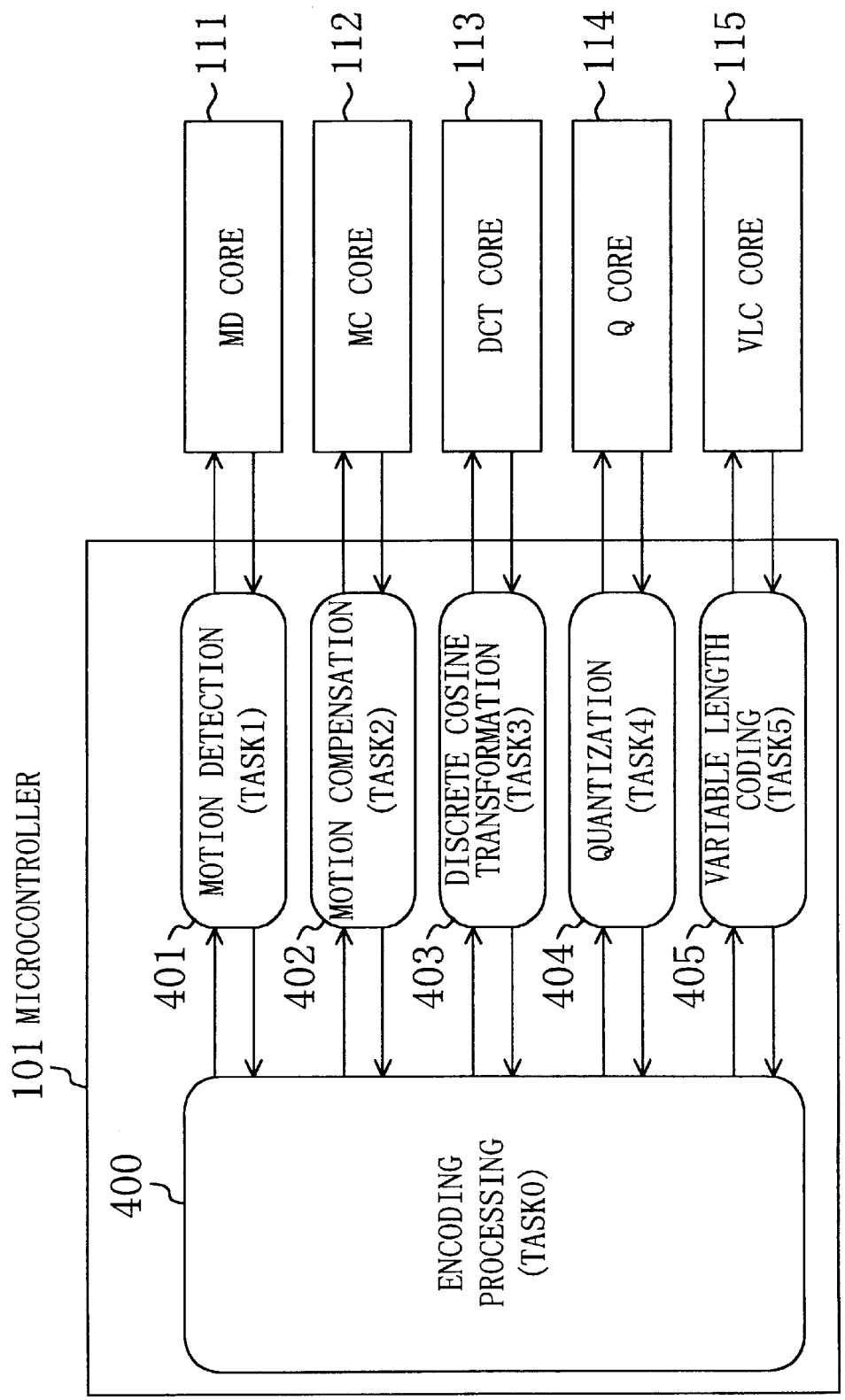
FIG. 4 is a conceptual diagram showing an association between cores and tasks in the MPEG image encoder of FIG. 1.

FIG. 4 illustrates an association between the cores and the tasks in the MPEG image encoder of FIG. 1. Here, the microcontroller 101 executes six tasks 400–405. The task 400 controls the five tasks 401–405 lower in hierarchy than the task 400 and is a main task (TASK0) for managing the entire encoding processing. The main task 400 is assigned no core. The task 401 is a motion detection task (TASK1) for controlling the allocated MD core 111. The task 402 is a motion compensation task (TASK2) for controlling the allocated MC core 112. The task 403 is a DCT task (TASK3) for controlling the allocated DCT core 113. The task 404 is a Q task (TASK4) for controlling the allocated Q core 114. Finally, the task 405 is a VLC task (TASK5) for controlling the allocated VLC core 115.

Suppose here that the task management table 310 of FIG. 3 stores task management information concerning at least six tasks (the six tasks 400–405). Referring to FIG. 3, the PRI INFO is set according to a priority setting signal 342. The CID INFO is set according to a core setting signal 343. The priority setting signal 342 is sent to the task management table 310 from the instruction decoder 303 if the instruction decoder 303 decodes a priority setting instruction. On the other hand, the core setting signal 343 is sent to the task management table 310 from the instruction decoder 303 if the instruction decoder 303 decodes a core setting instruction.

Figure 5:
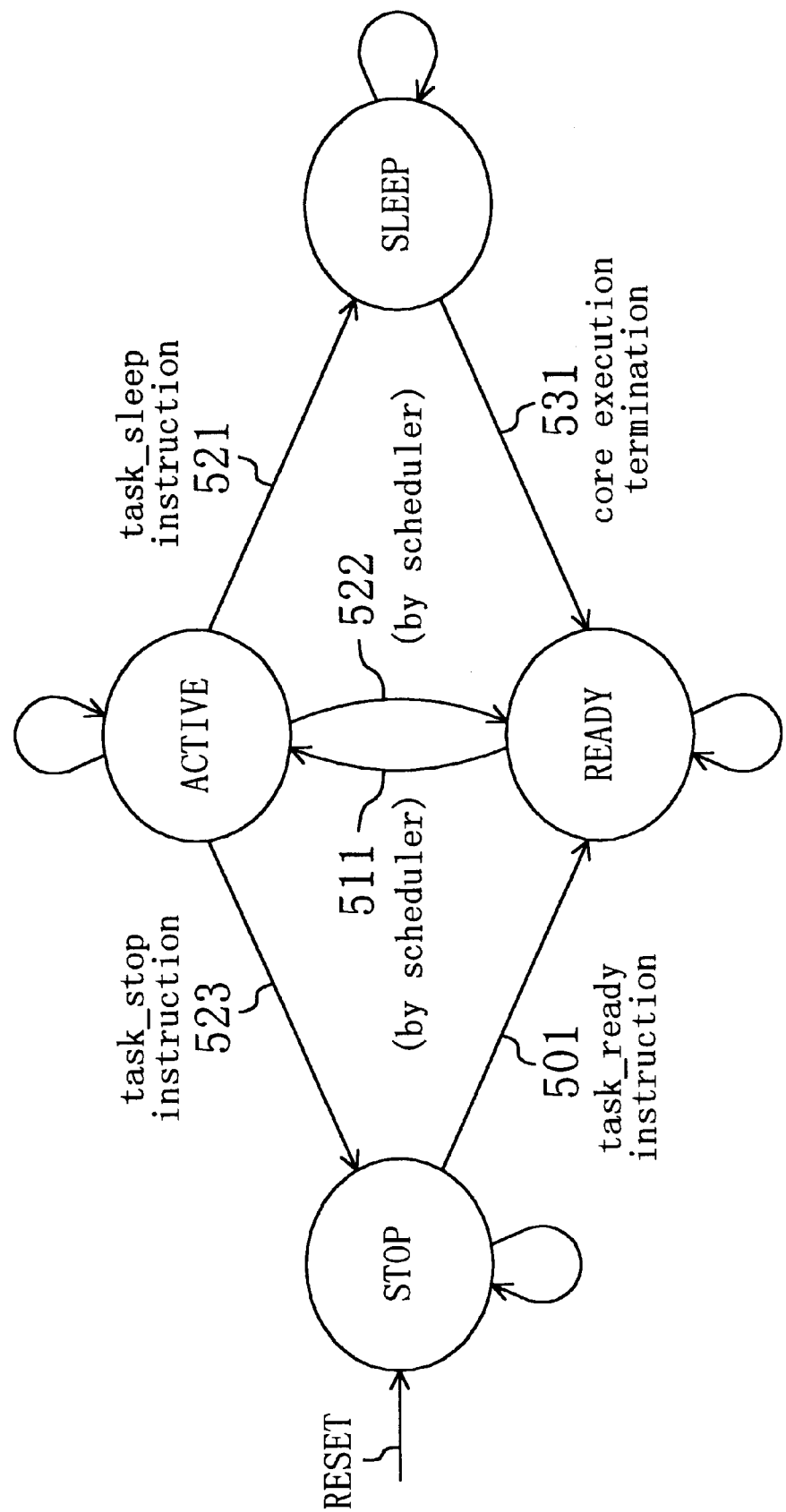
FIG. 5 is a conceptual diagram showing the state transition of a task in the MPEG image encoder of FIG. 1.

FIG. 5 is a conceptual diagram showing the state transition of each task. Each task can be in one of four states, namely, the state of STOP representative of a suspended status, the state of READY representative of an execution wait status, the state of ACTIVE representative of a running status, and the state of SLEEP representative of an allocated hardware engine execution termination wait status. SLEEP cannot exist for TASK0. If the task controller 201 is reset, it will assume the state of STOP for all tasks. A task in the state of STOP is changed to READY by a task_ready instruction (in other words, a transition 501 is made). If a task in the state of READY is selected by the scheduler 330 when an event requesting for task switching to be made occurs, the task is changed to ACTIVE (in other words, a transition 511 is made), at which time a task which has been placed in the state of ACTIVE up to the moment is changed to READY by the scheduler 330 (in other words, a transition 522 is made). A task in the state of ACTIVE is executed by the processor 300. A task in the state of ACTIVE can be changed to SLEEP by a task_sleep instruction (in other words, a transition 521 is made), alternatively it can be changed to STOP by a task_stop instruction (in other words, a transition 523 is made). A task in the state of SLEEP is changed to READY (in other words, a transition 531 is made) if the execution of a core allocated to that task is terminated.

Details of the operation of the task controller 201 of FIG. 3 are described here. Task switching occurs if the instruction decoder 303 decodes the task_ready instruction, the task_sleep instruction, or the task_stop instruction. For example, when a certain task is run to finish setting an operating parameter for a core allocated to the task and activating the core, the state of the task is changed from ACTIVE to SLEEP by the task_sleep instruction. Additionally, task switching occurs upon termination of the execution of any one of the five cores 111–115. The operating sequence of the task controller 201 at task switching time includes (1) activating the scheduler (SCHEDULER ACTIVATION), (2) saving the resources of a task under execution (RESOURCE SAVING), (3) selecting a task to be run next (TASK SELECTION), and (4) restoring the saved resources (RESOURCE RESTORATION).

Firstly, a task switching sequence on the basis of instructions is explained.

(A-1) SCHEDULER ACTIVATION

If the task_ready instruction, the task_sleep instruction, or the task_stop instruction is decoded, the instruction decoder 303 provides a state change signal 341. The state change signal 341 is sent to the state controller 331. As a result, the scheduler 330 is made active.

(A-2) RESOURCE SAVING

The state change signal 341 is also sent to the task management table 310 and the ST INFO is updated. At the same time, the value of the PC 301 of a task which has been executed up to the moment is saved in the task management table 310 through a signal line 344.

(A-3) TASK SELECTION

The priority encoder 333 receives from the task management table 310 the ST INFO and the PRI INFO through a signal line 351 and through a signal line 352 respectively, to select a task having the highest priority of execution in all tasks that are in the state of READY as a task to be run next. The task number 361 indicative of a result of the task selection operation is communicated to the state controller 331 and to the selector 334.

(A-4) RESOURCE RESTORATION

The state controller 331 sends to the task management table 310 a state change signal 364 according to the task number 361. As a result, the ST INFO of the task selected by the priority encoder 333 is updated from READY to ACTIVE. The selector 334 reads out the PC of the task designated by the task number 361 from the task management table 310 through a signal line 353, for forwarding onto a signal line 363. As a result, the value of the PC of the task to be run next is set in the processor 300 and the execution of the task starts.

Next, a task switching sequence on the basis of core execution termination is now described.

(B-1) SCHEDULER ACTIVATION

If the execution of any one of the cores is terminated, the termination signal 124 is sent to the TCDU 332. The TCDU 332 determines which of the cores is execution-terminated on the basis of the termination signal 124. Further, the TCDU 332 reads out the CID INFO stored in the task management table 310 through a signal line 354 and determines which of the tasks is allocated to the execution-terminated core. The task number 362 indicative of a result of the determination operation by the TCDU 332 is communicated to the state controller 331 if the task in question is confirmed to be in the state of SLEEP from the ST INFO, in consequence of which the scheduler 330 is activated. The state controller 331 sends to the task management table 310 the state change signal 364 according to the task number 362, as a result of which the ST INFO of the execution-terminated task is updated from SLEEP to READY. The scheduler 330 will not be activated if there exists no task allocated to the execution-terminated core.

(B-2) RESOURCE SAVING

The state controller 331 sends the state change signal 364 to the task management table 310 so that the ST INFO of a task that has been under execution up to the moment is updated from ACTIVE to READY. At the same time, the value of the PC 301 of the task is saved in the task management table 310.

(B-3) TASK SELECTION

The priority encoder 333 receives the ST INFO and the PRI INFO from the task management table 310 thereby selecting a task having the highest priority of execution in all tasks in the state of READY as a task to be run next. The task number 361 indicative of a result of the task selection operation is communicated to the state controller 331 as well as to the selector 334.

(B-4) RESOURCE RESTORATION

The state controller 331 sends to the task management table 310 the state change signal 364 according to the task number 361. The ST INFO of the task selected by the priority encoder 333 is updated from READY to ACTIVE. The selector 334 reads out the PC of the task designated by the task number 361 from the task management table 310, for forwarding to the processor 300. As a result, the value of the PC of the task to be run next is set in the processor 300 and the execution of the task in question starts.

Figure 6:
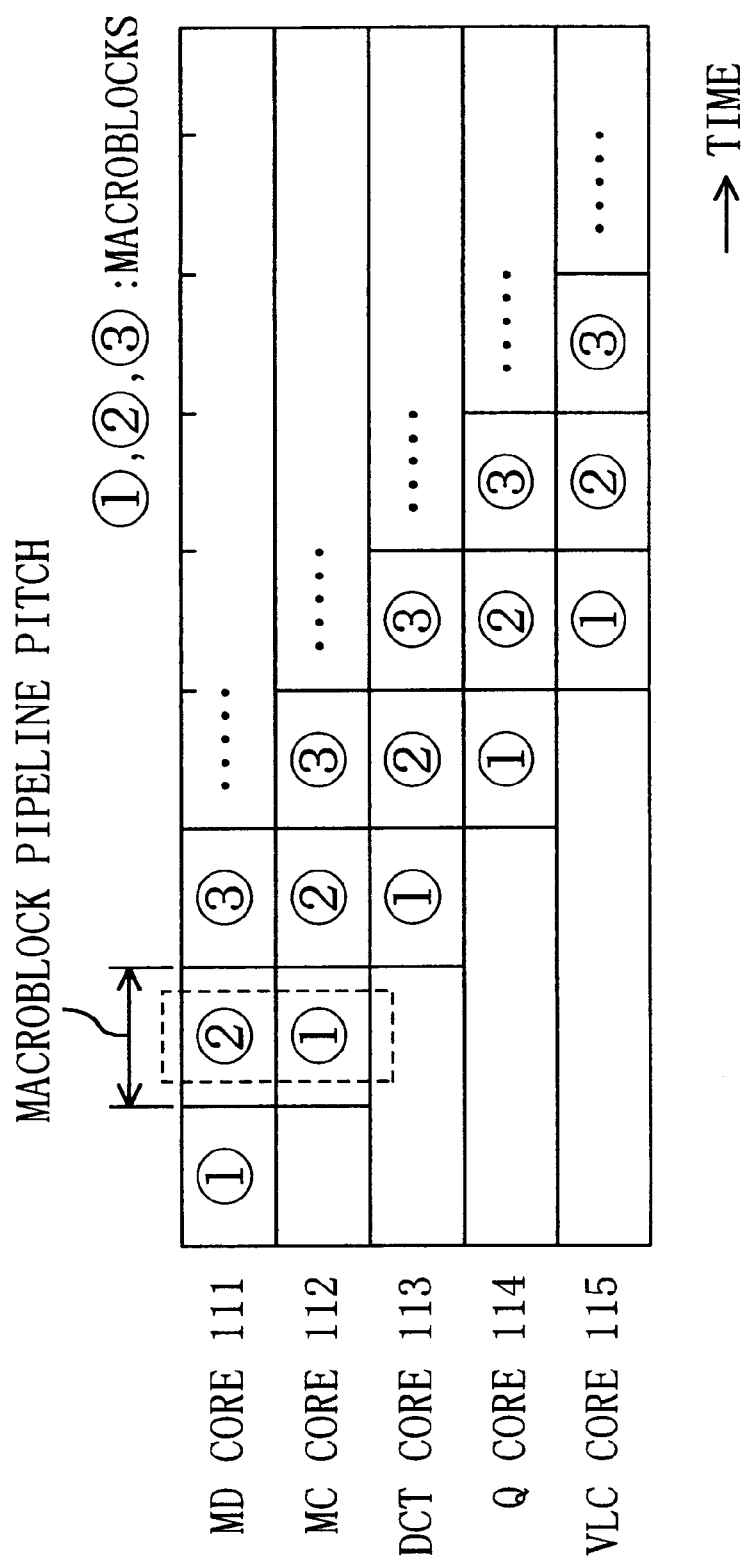
FIG. 6 is a timing diagram showing macroblock pipeline processing by the five cores of FIG. 1.

Referring now to FIG. 6, therein shown is macroblock pipeline processing by the five cores 111–115 of FIG. 1. The pipeline pitch is set at a maximum value of the time taken to process one macro block in each core, which means that there is a characteristic that in the individual pipeline pitches, there exists a core the execution of which is terminated earlier than the other cores. This therefore produces idle time and there is a characteristic that the length of such idle time varies depending on the image data. In the example of FIG. 1, an MPEG image encoder adaptive to the foregoing characteristics is implemented by means of task switching adopting an event driven method. The number of times a core is activated in an individual pipeline pitch period varies depending on the contents and data of processing carried out in the core. For instance, the DCT core 113 is activated once per pipeline pitch period. On the other hand, the MC core 112 is activated a plurality of times per pipeline pitch period depending on the data, since in the MC core 112 data of one macroblock is divided into luminance and chrominance components and processing is subdivided for the components and carried out.

Figure 7:
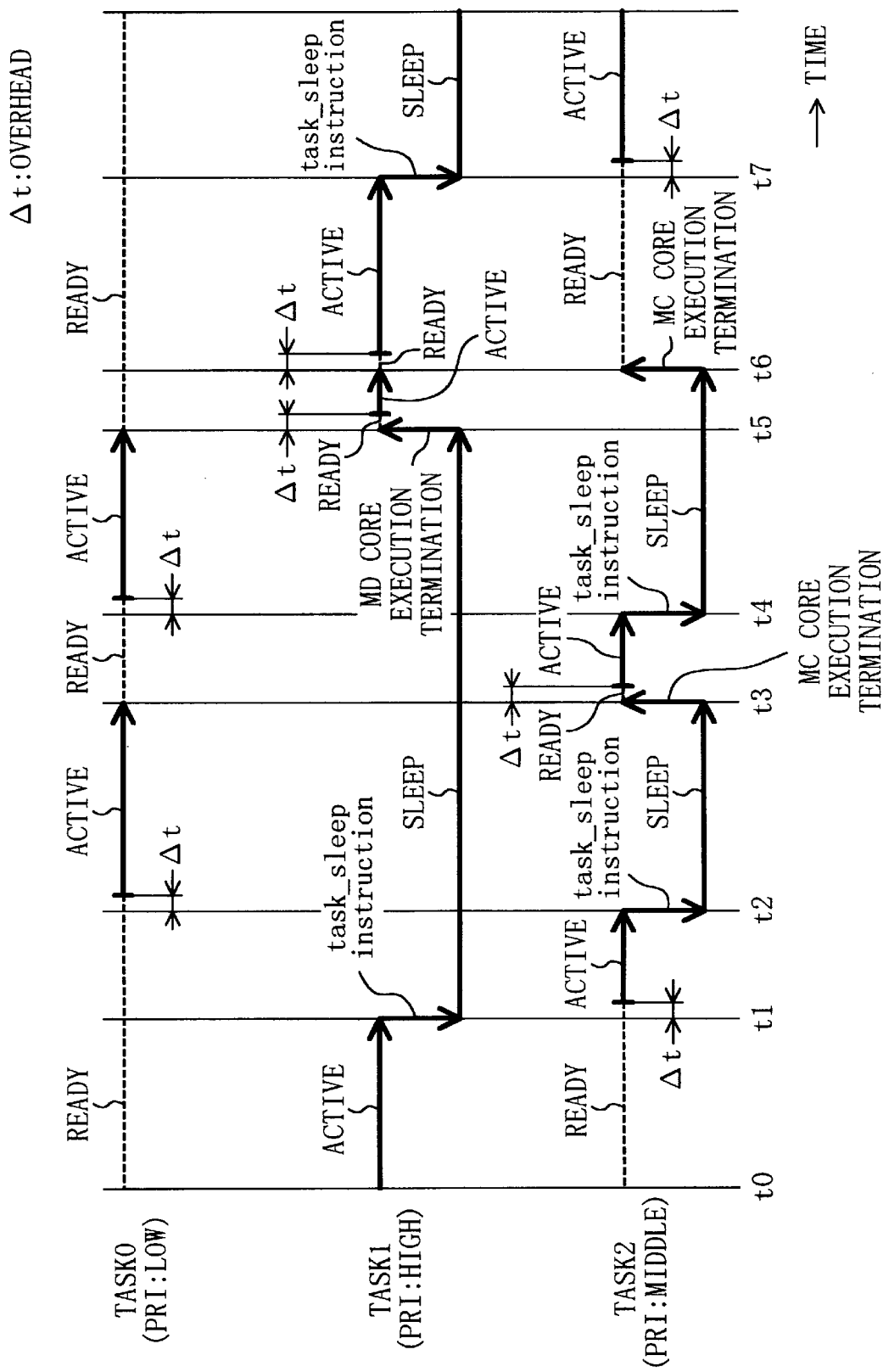
FIG. 7 is a timing diagram showing the state transition of three tasks during a part period of FIG. 6.

FIG. 7 shows the state transition of each of three tasks in a part period specified by broken line of FIG. 6. TASK0 is a main task for managing an entire encoding process, TASK1 is a task allocated to the MD core 111, and TASK2 is a task allocated to the MC core 112 (see FIG. 4). In these three tasks, TASK1 has the highest execution priority. TASK2 has the second highest execution priority. TASK0 has the lowest execution priority. Suppose that at time t0, TASK1 is in the state of ACTIVE and TASK0 and TASK2 are in the state of READY.

FIG. 7 shows that task switching occurs at each time t1–t7. In FIG. 7, At represents the overhead of one task switching operation. The description will be made in order. TASK1 makes the MD core 111 active prior to time t1. At time t1, the state of TASK1 is changed from ACTIVE to SLEEP by the task_sleep instruction. At this point in time, although TASK0 and TASK2 are in the state of READY, it is TASK2 that is allowed to make a transition from READY to ACTIVE, since TASK2 has priority of execution over that of TASK0. TASK2 makes the MC core 112 active. Then, at time t2, the state of TASK2 is changed from ACTIVE to SLEEP by the task_sleep instruction. At this point in time, only TASK0 assumes the state of READY. TASK0 therefore makes a state transition from READY to ACTIVE. At time t3, the state of TASK2 is changed from SLEEP to READY by the execution termination of the MC core 112 and the state of TASK0 (which has been in the state of ACTIVE up to the moment) moves to READY. At this point in time, although TASK0 and TASK2 are in the state of READY, it is TASK2 that is allowed to make a state transition from READY to ACTIVE, since TASK2 has priority of execution over that of TASK0. TASK2 again activates the MC core 112. At time t4, the state of TASK2 is changed from ACTIVE to SLEEP by the task_sleep instruction, at which point in time only TASK0 is in the state of READY. TASK0 therefore makes a state transition from READY to ACTIVE. At time t5, the state of TASK1 is changed from SLEEP to READY by the execution termination of the MD core 111 and the state of TASK0 (which has been in the state of ACTIVE up to the moment) moves to READY. At this point in time, although TASK0 and TASK1 are in the state of READY, it is TASK1 that is allowed to make a state transition from READY to ACTIVE, since TASK1 has priority of execution over that of TASK0. At time t6, the state of TASK2 is changed from SLEEP to READY by the execution termination of the MC core 112 and the state of TASK1 (which has been in the state of ACTIVE up to the moment) moves to READY. At this point in time, although TASK0, TASK1, and TASK2 are all in the state of READY, it is TASK1 that is allowed to return to ACTIVE from READY, since TASK1 has the highest execution priority in all the tasks. TASK1 again makes the MD core 111 active. At time t7, the state of TASK1 is changed from ACTIVE to SLEEP by the task_sleep instruction. At this point in time, although TASK0 and TASK2 are in the state of READY, it is TASK2 that is allowed to make a state transition from READY to ACTIVE, since TASK2 has priority of execution over that of TASK0.

In cases where task switching, based on a time sharing method utilizing a conventional interruption handling routine, is adopted, the overhead of one task switching operation amounts to ten-odd machine cycles. On the other hand, for the case of task switching based on an event driven method according to the present invention, the overhead, At, of FIG. 7 is only several machine cycles. Taking into account the fact that task switching occurs twenty-odd times at most in an individual macropipeline pitch period, the difference in overhead between the foregoing methods further increases. Reduction in the overhead achieved by the present invention makes it possible to achieve also a reduction in the pipeline pitch. In other words, it is possible to achieve high-speed encoding of image data.

As described above, high-speed task switching can be realized in the MPEG image encoder of FIG. 1. If a task that executes a time critical process is assigned higher priority of execution, this guarantees normal image encoding processing. When the execution of a core is terminated, both the state of a task allocated to the execution-terminated core and the state of a task which has been under execution up to the moment are first changed to READY, and a task having the highest priority of execution in all tasks in the state of READY is selected as one to be run next. This can provide a simplified internal structure to the priority encoder 333. Additionally, it is possible to independently describe programs for tasks. This not only improves efficiency in programming but also provides advantages over debugging.

The present invention is applicable to other data processing systems including an image decoder. In the foregoing description, each hardware engine (core) is assigned one task. There may be a core that is assigned no task. Additionally, there may be a core that is assigned a plurality of tasks. The same task is never simultaneously allocated to a plurality of cores.

What is claimed is:

1. A microcontroller comprising:
   (a) a processor for sequentially executing a plurality of tasks in accordance with programmed instructions, said processor operating in conjunction with a plurality of hardware engines;
   (b) a task management table for storing task management information including (1) state information representative of the execution status of each said task, (ii) priority information representative of the execution priority of each said task, and (iii) allocation information representative of the allocation of said plurality of tasks to said plurality of hardware engines; and
   (c) a scheduler for allowing, on the basis of said task management information, said processor to switch between tasks, wherein each said plurality of hardware engines starts execution of a data process upon the activation by said processor and, if said data process is terminated, informs said scheduler of the termination of execution, and said scheduler allows said processor to switch between tasks if the termination of execution of any one of said hardware engines is detected.

2. The microcontroller according to claim 1, wherein each said task can be in one of a first state representative of an execution wait status, a second state representative of a running status, and a third state representative of a wait status awaiting the termination of execution of a hardware engine allocated thereto.

3. The microcontroller according to claim 2, wherein when during execution of a task of said plurality of tasks said processor activates a hardware engine allocated to said task under execution before decoding a given instruction, said processor performs a function of updating said state information so that said task makes a state transition from said second state to said third state.

4. The microcontroller according to claim 2,
   said scheduler including:
      a determination unit for identifying, when the execution of any one of said plurality of hardware engines is terminated, a task allocated to said execution-terminated hardware engine on the basis of said task management information; and
      a state controller which performs, upon being activated by said determination unit, a function of updating said state information so that said identified task makes a state transition from said third state to said first state.

5. The microcontroller according to claim 4, wherein said state controller performs, upon being activated by said determination unit, a function of updating said state information so that a task under execution makes a state transition from said second state to said first state.

6. The microcontroller according to claim 4, wherein said scheduler further includes a priority encoder for selecting, on the basis of said task management information, a task having the highest execution priority in all tasks that are in said first state as a task to be run next.

7. The microcontroller according to claim 6, wherein said state controller further performs a function of updating said state information so that said task selected by said priority encoder makes a state transition from said first state to said second state.

8. The microcontroller according to claim 1, wherein said task management table has a region in which to save resources of said processor concerning a task that was run prior to the occurrence of the aforesaid task switching.

9. The microcontroller according to claim 1 further comprising a plurality of register files for use by said plurality of hardware engines as mutually independent working areas.

10. The microcontroller according to claim 1 further comprising a register file used to store a setting parameter common to at least two of said plurality of hardware engines.

11. A data processing system comprising:
    a plurality of hardware engines for executing respective data processes; and
    a microcontroller for controlling said plurality of hardware engines;
    said microcontroller including:
        a processor for sequentially executing a plurality of tasks in accordance with programmed instructions, said processor operating in conjunction with said plurality of hardware engines;
        a task management table for storing task management information including (i) state information representative of the execution status of each said task, (ii) priority information representative of the execution priority of each said task, and (iii) allocation information representative of the allocation of said plurality of tasks to hardware engines; and
        a scheduler for allowing, on the basis of said task management information, said processor to switch between tasks, wherein each said plurality of hardware engines starts execution of a data process upon the activation by said processor and, if said data process is terminated, informs said scheduler of the termination of execution, and said scheduler allows said processor to switch between tasks if the termination of execution of any one of said hardware engines is detected.

12. The data processing system according to claim 11, wherein each said task can be in one of a first state representative of an execution wait status, a second state representative of a running status, and a third state representative of a wait status awaiting the termination of execution of a hardware engine allocated thereto.

13. The data processing system according to claim 11, wherein each of said plurality of hardware engines is a subprocessing core for MPEG image data encoding.

14. A task switching control method including allocating one or more tasks to corresponding hardware engines and controlling, based on information about such task/hardware engine allocation, task switching by the use of a scheduler, wherein:
    each said hardware engines starts execution of a data process upon the activation by a processor and, if said data process is terminated, informs said scheduler of the termination of execution;

each said task can be in one of a first state representative of an execution wait status, a second state representative of a running status, and a third state representative of a wait status awaiting the termination of execution of a hardware engine allocated thereto; and when the execution of any one of said hardware engines is terminated, said scheduler changes the state of a task allocated to said executon-terminated hardware engine from said third state to said first state so as to allow said processor to switch between tasks.

15. The method according to claim 14, wherein when the execution of a hardware engine is terminated, the state of a task under execution is changed from said second state to said first state.

* * * * *